No. 842,339. PATENTED JAN. 29, 1907.
C. RUSSO.
APPARATUS FOR ELECTRICALLY INDICATING WEIGHT.
APPLICATION FILED APR. 4, 1906.
2 SHEETS—SHEET 1.
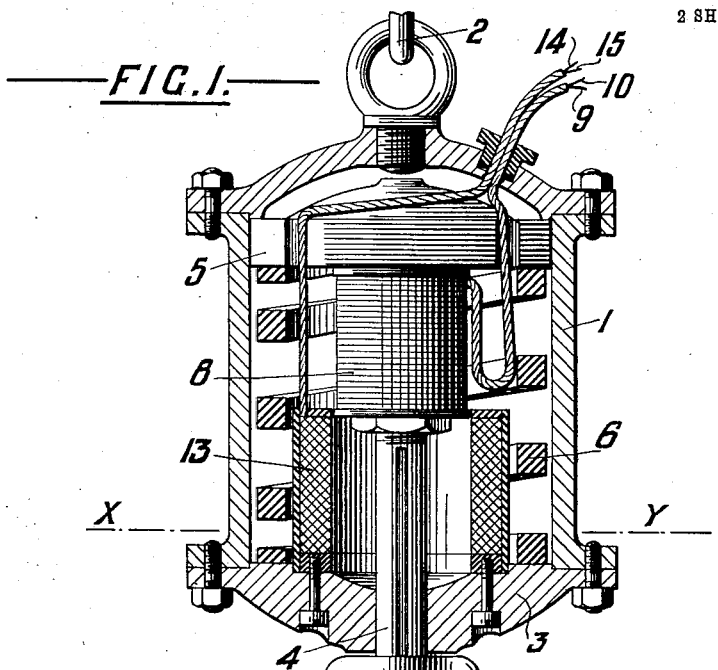
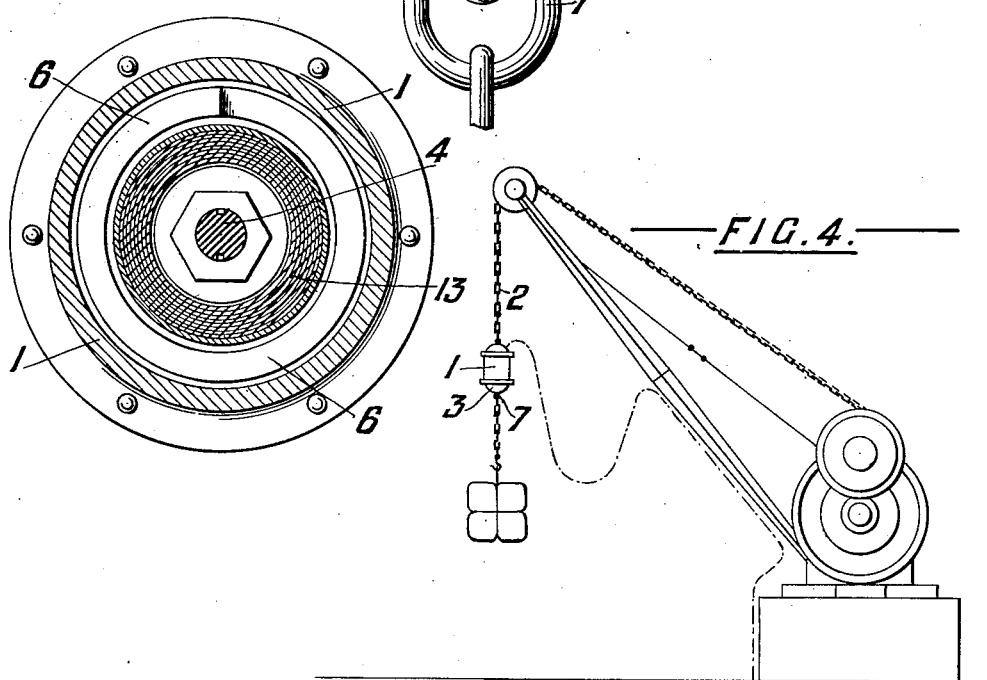

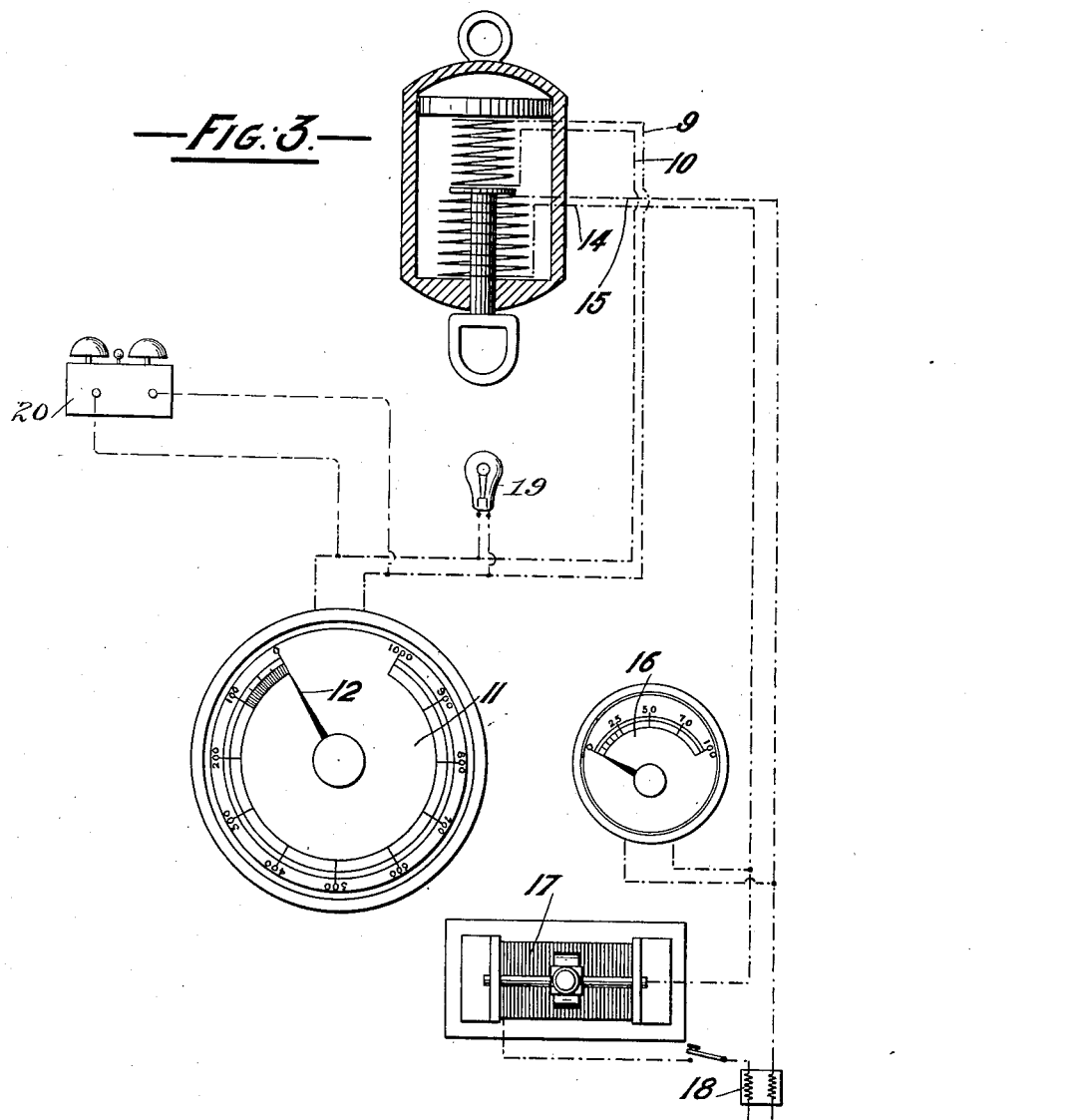

UNITED STATES PATENT OFFICE.

CHARLES RUSSO, OF LONDON, ENGLAND, ASSIGNOR TO MARCONI'S WIRELESS TELEGRAPH COMPANY LIMITED, OF LONDON, ENGLAND.

APPARATUS FOR ELECTRICALLY INDICATING WEIGHT.

No. 842,339.

Specification of Letters Patent.

Patented Jan. 29, 1907.

Application filed April 4, 1906. Serial No. 309,952.

*To all whom it may concern:*

Be it known that I, CHARLES RUSSO, a subject of the King of Great Britain and Ireland, and a resident of London, England, have invented certain new and useful Improvements in Apparatus for Electrically Indicating Weight; and I do hereby declare that the following is a full, clear, and exact description of the same.

It has been heretofore proposed to indicate the weight of articles lifted or supported by a crane or the like or by a weigh-beam or balance upon a dial by mechanical means. Thus, for instance, it has been proposed to cause the weight supported by a crane to act through levers and rods upon an index-dial, whereby the weight can be ascertained by the position assumed by an index-finger upon the dial.

Now the object of this invention is to enable the weight of articles lifted or supported by a crane or weighing-machine to be positively and automatically indicated upon a dial which may be located at a distance from the machine supporting the said articles, and this entirely by electrical means. Thus the object of the invention as applied to a crane, for instance, would be to provide that the loads lifted from time to time by the crane should be automatically indicated by the action of the electric current upon a dial located in an office at a distance from the said crane, and this without calling for any manual operation or control, and, further, if so desired, the indicating-dial might be fitted with any known adding, recording, or counting mechanism by which the total weight lifted or supported by the machine—say the crane—might be added and recorded, and a signal, such as by a light or bell, might be given at each weighing operation to draw attention to the indication of the dial.

According to this invention I provide that the weight carried by the machine moves a member—such as a platform, lever, or piston—against the action of a weight or spring, and such moving member carries a solenoid or bobbin which is in circuit with any suitable indicating mechanism, such as an ammeter. Immediately below this solenoid is an annular winding or solenoid, into the central space of which the first solenoid or bobbin will pass more or less deeply, according as the weight of the article draws down the first solenoid against the mechanical resistance of a weight or spring. The winding of the second annular solenoid, which is stationary relatively to the first, is placed in circuit with some source of electricity, so that an alternating current passes through the coil of the second solenoid, and then as the first solenoid descends or is advanced into the second by the weight of the articles being weighed an induced current will be set up in the first solenoid in proportion to the distance which it is caused to enter the second.

The weight-indicating mechanism which is in circuit with the first solenoid may be of any convenient construction and should be capable of measuring the progressive increase of the current and recording this increase by a finger which is moved round the dial as the induced current increases, and the dial should be indexed so as to show by the position of the index-finger what weight is at that time supported by the machine. Obviously I may place in circuit with the first solenoid an incandescent lamp or a bell, or both, which will be put into action during the weighing operation and draw attention to the weight indicated at the time of such indication.

The primary current passing through the second solenoid should be maintained as constant as possible, and for this purpose its circuit is fitted with a rheostat and a voltmeter or other means by which the current can be regulated when required.

As a practical example of application of this invention I will now describe it more fully as applied to a crane, and this with reference to the accompanying drawings, where—

At Figure 1, is shown in vertical section a weighing mechanism carrying the solenoids before mentioned and contained within a cylinder adapted to be suspended from the chain of the crane in place of the usual counterweight. Fig. 2 is an inverted horizontal section taken about the line X Y of Fig. 1. Fig. 3 is a diagram showing the electrical connections of the weighing apparatus and of the recording and regulating mechanism, and Fig. 4 is a diagrammatic elevation of a crane fitted with the construction of apparatus which has been selected for illustration.

Referring to the drawings illustrating the invention applied to a crane, I provide a cylinder 1, suspended from the chain 2, in place, for instance, of the usual counterweight. Entering the lower cover 3 of the cylinder is a rod 4, which is capable of motion through the cover in the direction of the axis of the cylinder. Within this cylinder 1 is a collar or piston 5, fixed to the upper end of the said rod 4, and between the lower face of the piston 5 and the lower cover 3 of the cylinder is a spring 6. This spring 6 is adapted to become more or less compressed, according to the weight of the load suspended from the lower end of the rod 4 by, for instance, a shackle and hook 7, which may be of any ordinary construction. Upon a load being suspended from the said rod 4 the latter will have motion in the direction of its axis relatively to the cylinder 1 in proportion to the weight of the load suspended, and generally in order to prevent rotation of the rod 4 the latter may be formed or provided with a groove or feather to engage with the cover.

Around the upper end of the suspension-rod 4 and carried thereby is a solenoid or winding 8, the terminals of which are in electrical connection by conductors 9 10 with any suitable device (indicated at 11, Fig. 3,) calculated to measure the progressive increase of a current of electricity and to record that increase by a finger being moved around a dial. An ammeter may be utilized, located as indicated at 11 in the diagram at Fig. 3, and the dial should be indexed, so as to show by the position of the index-finger 12 what weight is at the time held suspended by the apparatus, which can readily be done by testing known weights upon the crane.

In order to induce electrical currents in the solenoid 8, bearing proportion to the weights supported by the rod 4, there is carried in the cylinder 1 and fixed thereto (in this case to the lower cover 3) an annular solenoid or winding 13, and the terminals of the coil 13 are connected to conductors 14 15, by which a current of electricity passes through the coil 13 from some suitable source of supply, the said current being alternating.

The primary current passing through the conductors 14 15 and through the second annular solenoid 13 should be maintained as constant as possible, and for this purpose the circuit of the coil 13 should be fitted with a voltmeter (indicated at 16, Fig. 3) and with a rheostat, of any suitable construction, (indicated at 17,) and the said current through the primary coil 13 having been duly regulated the indicator-dial 11 may be properly indexed by testing, as before explained. 18 is a fuse. When the primary electrical current is derived from a circuit supplied with continuous current a transformer would be arranged, as is well known, to supply the requisite alternating current to the said primary coil.

Adjacent to the weight-indicating dial 11 and in connection with the conductors 9 10 I may provide an electric lamp 19 and a signaling-bell 20, as represented, for example, in Fig. 3, where the lamp and bell are shown in circuit with the ammeter 11, so that immediately a weight becomes suspended or supported the induced current will cause the lighting of the lamp and the ringing of the bell, so as to draw attention to the weight-indicator.

It will now be understood that the weight carried by the machine moves a member, such as the rod 4 and piston 5, against the action of a weight or of a spring, such as 6, and carries a solenoid, such as 8, more or less into an annular solenoid, such as 13, which is stationary relatively to the moving solenoid, and the winding of the second annular solenoid being in circuit with some source of alternating current an induced current will be set up in the first solenoid in proportion to the distance it is caused to enter the second, and this induced current acts upon an indicator device to operate a finger upon a dial indexed to show the weights supported.

What I claim as my invention, and desire to secure by patent, is—

1. In an apparatus for electrically indicating the weights of articles weighed; a member for supporting the articles being weighed and adapted to vary in position in proportion to the weights supported, a solenoid carried by the weight-regulated member, a second solenoid mounted so as to be stationary relatively to the first solenoid, so that one solenoid will enter the other solenoid more or less according to the weight supported by the weight-regulated member, means for causing an alternating electric current to pass through the stationary solenoid to induce a current in the winding of the other solenoid in proportion to the extent to which one solenoid enters the other, an electrical measuring device in circuit with the solenoid in which the current is induced calculated to indicate the variations of the induced current upon a dial, and a dial having markings thereon adapted to show the weight of the articles being weighed.

2. In an apparatus for electrically indicating the weights of articles weighed; the combination with a member for supporting the articles being weighed and mechanism to cause said member to vary in position in proportion to the weights supported, a solenoid carried by the weight-regulated member, an electrical measuring device in circuit with said solenoid to indicate upon a dial the variations of a current passing through said solenoid, and a dial having markings thereon adapted to show the weight of the articles being weighed; of an annular solenoid arranged coaxial with the first solenoid, means for causing an alternating electric current to pass through said annular solenoid to induce a current in the winding of the first solenoid in proportion to the extent which the latter enters the annular solenoid, a stationary support for carrying the annular solenoid, and means for maintaining the current constant which passes through the annular solenoid substantially as set forth.

3. In an apparatus for electrically indicating the weights of articles weighed; the combination with a spring-balanced support for the article being weighed, said support varying in position in proportion to the weight supported, a solenoid fixed to the said spring-balanced support, an electrical measuring device in circuit with the said solenoid to indicate upon a dial the variations of a current passing through said solenoid, and a dial having markings thereon adapted to show the weight of the articles being weighed; of a frame stationary relative to the spring-balanced support, an annular solenoid carried by the frame and arranged coaxial with the first solenoid, and means for causing a constant alternating current to pass through said annular solenoid to induce a current in the windings of the first solenoid in proportion to the extent which the latter enters said annular solenoid substantially as set forth.

4. In an apparatus for electrically indicating the weights of articles weighed; the combination of a cylinder, a piston in the cylinder, and a rod connected to the piston and passing through the head thereof to support the articles being weighed, a spring acting between the cylinder-head and the piston, a solenoid fixed to the piston, an electrical measuring device in circuit with the said solenoid to indicate upon a dial the variations of a current passing through said solenoid, a dial having markings adapted to show the weight of the articles being weighed, an annular solenoid fixed to the piston-head and located coaxial with the first solenoid, so that the latter will enter the annular solenoid more or less in proportion to the weight supported by the piston, means for causing an alternating current to pass through the windings of said annular solenoid, and means for maintaining said current constant substantially as set forth.

5. In an apparatus for electrically indicating the weights of articles weighed; the combination of a cylinder, a piston in the cylinder, and a rod connected to the piston and passing through the head thereof to support the articles being weighed, a spring acting between the cylinder-head and the piston, a solenoid fixed to the piston, an ammeter in circuit with the said solenoid to indicate upon a dial the variations of a current passing through said solenoid, an ammeter-dial having markings thereon adapted to show the weight of the articles being weighed, an annular solenoid fixed to the cylinder-head and located coaxial with the first solenoid, so that the latter will enter the annular solenoid more or less in proportion to the weight supported by the piston, means for causing an alternating current to pass through the windings of the annular solenoid, and means for maintaining the said current constant substantially as set forth.

6. In electrically indicating the weights of articles weighed; the combination of a cylinder, a piston in the cylinder, and a rod connected to the piston and passing through the head thereof to support the articles being weighed, a spring acting between the cylinder-head and the piston, a solenoid fixed to the piston, an ammeter in circuit with the said solenoid to indicate upon a dial the variations of a current passing through the said solenoid, an ammeter-dial having markings thereon adapted to show the weight of the articles being weighed, an annular solenoid fixed to the cylinder-head and located coaxial with the first solenoid, so that the latter will enter the annular solenoid more or less in proportion to the weight supported by the piston, means for causing an alternating current to pass through the windings of the annular solenoid, a voltmeter and a rheostat in circuit with the coil of the annular solenoid for regulating and maintaining a constant current through the said annular solenoid substantially as set forth.

CHARLES RUSSO.

Witnesses:
GRIFFITH BREWER,
WILLIAM A. MARSHALL.